(12) United States Patent
Wu et al.

(10) Patent No.: US 8,838,353 B2
(45) Date of Patent: Sep. 16, 2014

(54) TRAILER SWAY MITIGATION USING MEASURED DISTANCE BETWEEN A TRAILER AND A TOW VEHICLE

(75) Inventors: Hsien-cheng Wu, Novi, MI (US); Dieter Hoetzer, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 766 days.

(21) Appl. No.: 12/508,878

(22) Filed: Jul. 24, 2009

(65) Prior Publication Data
US 2011/0022282 A1 Jan. 27, 2011

(51) Int. Cl.
| | |
|---|---|
| *B60T 8/172* | (2006.01) |
| *B60D 1/58* | (2006.01) |
| *B60T 8/24* | (2006.01) |
| *B60T 7/20* | (2006.01) |
| *B60T 8/17* | (2006.01) |
| *B60D 1/24* | (2006.01) |
| *B60D 1/30* | (2006.01) |

(52) U.S. Cl.
CPC ............... *B60T 7/20* (2013.01); *B60T 2230/06* (2013.01); *B60D 1/58* (2013.01); *B60T 8/248* (2013.01); *B60T 8/1708* (2013.01); *B60D 1/245* (2013.01); *B60T 8/246* (2013.01); *B60D 1/30* (2013.01)
USPC ........ 701/70; 180/14.1; 180/14.6; 188/112 R; 188/112 A; 340/431

(58) Field of Classification Search
USPC ......... 701/69, 70; 180/14.1, 14.6; 188/112 A, 188/112 R; 280/446.1, 455.1; 303/20; 340/431
See application file for complete search history.

(56) References Cited

U.S. PATENT DOCUMENTS

| | | |
|---|---|---|
| 3,908,782 A | 9/1975 | Lang et al. |
| 4,023,863 A | 5/1977 | Sisson et al. |
| 4,023,864 A | 5/1977 | Lang et al. |
| 4,034,822 A | 7/1977 | Stedman |
| 4,232,910 A | 11/1980 | Snyder |
| RE30,550 E | 3/1981 | Reise |
| 4,254,998 A | 3/1981 | Marshall et al. |
| 4,275,898 A | 6/1981 | Muste Llambrich |
| 4,697,817 A | 10/1987 | Jefferson |

(Continued)

FOREIGN PATENT DOCUMENTS

| | | |
|---|---|---|
| CN | 1661392 | 8/2005 |
| DE | 19964048 | 1/2001 |

(Continued)

OTHER PUBLICATIONS

U.S. Appl. No. 12/512,783, filed Jul. 30, 2009, Wu et al.

(Continued)

*Primary Examiner* — Thomas G Black
*Assistant Examiner* — Peter D Nolan
(74) *Attorney, Agent, or Firm* — Michael Best & Friedrich LLP

(57) ABSTRACT

A method of controlling a vehicle and a trailer. The vehicle has a front and a rear end, and the trailer is coupled to the rear end. The method includes sensing a plurality of vehicle characteristics, sensing a distance between the vehicle and the trailer with at least one sensor positioned on the rear end of the vehicle, determining an oscillatory action of the trailer based on the sensed distance, and applying a braking force on at least one wheel of the vehicle in response to the oscillatory action.

16 Claims, 4 Drawing Sheets

(56) References Cited

U.S. PATENT DOCUMENTS

| | | | |
|---|---|---|---|
| 4,706,984 A | 11/1987 | Esler et al. | |
| 4,850,249 A | 7/1989 | Kirstein | |
| 5,011,170 A | 4/1991 | Forbes et al. | |
| 5,022,714 A | 6/1991 | Breen | |
| 5,029,948 A | 7/1991 | Breen et al. | |
| 5,139,374 A | 8/1992 | Holt et al. | |
| 5,333,940 A | 8/1994 | Topfer | |
| 5,348,331 A | 9/1994 | Hawkins | |
| 5,380,072 A | 1/1995 | Breen | |
| 5,671,982 A | 9/1997 | Wanke | |
| 5,707,071 A | 1/1998 | Prestidge et al. | |
| 5,747,683 A | 5/1998 | Gerum et al. | |
| 5,799,745 A | 9/1998 | Fukatani | |
| 5,861,802 A | 1/1999 | Hungerink et al. | |
| 5,964,819 A | 10/1999 | Naito | |
| 5,986,544 A | 11/1999 | Kaisers et al. | |
| 6,012,780 A | 1/2000 | Duvernay | |
| 6,042,196 A | 3/2000 | Nakamura et al. | |
| 6,074,020 A | 6/2000 | Takahashi et al. | |
| 6,223,114 B1 | 4/2001 | Boros et al. | |
| 6,272,407 B1 | 8/2001 | Scholl | |
| 6,311,111 B1 | 10/2001 | Leimbach et al. | |
| 6,324,447 B1 | 11/2001 | Schramm et al. | |
| 6,349,247 B1 | 2/2002 | Schramm et al. | |
| 6,438,464 B1 | 8/2002 | Woywod et al. | |
| 6,446,998 B1 | 9/2002 | Koenig et al. | |
| 6,450,019 B1 | 9/2002 | Wetzel et al. | |
| 6,452,485 B1 | 9/2002 | Schutt et al. | |
| 6,466,028 B1 | 10/2002 | Coppinger et al. | |
| 6,476,730 B2 | 11/2002 | Kakinami et al. | |
| 6,480,104 B1 | 11/2002 | Wall et al. | |
| 6,494,281 B1 | 12/2002 | Faye et al. | |
| 6,498,977 B2 | 12/2002 | Wetzel et al. | |
| 6,501,376 B2 | 12/2002 | Dieckmann et al. | |
| 6,516,260 B2 | 2/2003 | Wetzel et al. | |
| 6,516,925 B1 | 2/2003 | Napier et al. | |
| 6,522,956 B2 | 2/2003 | Hecker et al. | |
| 6,523,911 B1* | 2/2003 | Rupp et al. | 303/7 |
| 6,553,284 B2 | 4/2003 | Holst et al. | |
| 6,600,974 B1* | 7/2003 | Traechtler | 701/1 |
| 6,604,035 B1 | 8/2003 | Wetzel et al. | |
| 6,636,047 B2 | 10/2003 | Arlt et al. | |
| 6,655,710 B2 | 12/2003 | Lindell et al. | |
| 6,668,225 B2 | 12/2003 | Oh et al. | |
| 6,756,890 B1 | 6/2004 | Schramm et al. | |
| 6,788,190 B2 | 9/2004 | Bishop | |
| 6,873,891 B2 | 3/2005 | Moser et al. | |
| 6,959,970 B2 | 11/2005 | Tseng | |
| 7,114,786 B2 | 10/2006 | Bess et al. | |
| 7,125,086 B2 | 10/2006 | Tanaka et al. | |
| 7,204,564 B2 | 4/2007 | Brown et al. | |
| 7,226,134 B2 | 6/2007 | Horn et al. | |
| 7,272,481 B2 | 9/2007 | Einig et al. | |
| 7,277,786 B2 | 10/2007 | Stumpp et al. | |
| 7,301,479 B2* | 11/2007 | Regan | 340/932.2 |
| 7,302,332 B2 | 11/2007 | Nenninger | |
| 7,394,354 B2 | 7/2008 | Yu | |
| 7,401,871 B2 | 7/2008 | Lu et al. | |
| 7,561,953 B2 | 7/2009 | Yu | |
| 7,798,263 B2* | 9/2010 | Tandy et al. | 180/14.6 |
| 7,904,222 B2* | 3/2011 | Lee et al. | 701/41 |
| 7,917,274 B2 | 3/2011 | Hackney et al. | |
| 8,010,252 B2* | 8/2011 | Getman et al. | 701/37 |
| 8,060,288 B2 | 11/2011 | Choby | |
| 2004/0021291 A1 | 2/2004 | Haug et al. | |
| 2004/0246116 A1 | 12/2004 | Polzin | |
| 2004/0249547 A1 | 12/2004 | Nenninger | |
| 2005/0006946 A1 | 1/2005 | Traechtler | |
| 2005/0065694 A1 | 3/2005 | Nenninger | |
| 2005/0161901 A1* | 7/2005 | Ahner et al. | 280/432 |
| 2005/0206224 A1 | 9/2005 | Lu | |
| 2006/0025896 A1 | 2/2006 | Traechtler et al. | |
| 2006/0033308 A1 | 2/2006 | Waldbauer et al. | |
| 2006/0125313 A1 | 6/2006 | Gunne et al. | |
| 2006/0155457 A1 | 7/2006 | Waldbauer et al. | |
| 2006/0204347 A1 | 9/2006 | Waldbauer et al. | |
| 2006/0206253 A1* | 9/2006 | Yu | 701/70 |
| 2006/0229782 A1 | 10/2006 | Deng et al. | |
| 2006/0273657 A1 | 12/2006 | Wanke et al. | |
| 2007/0260385 A1 | 11/2007 | Tandy, Jr. et al. | |
| 2008/0036296 A1* | 2/2008 | Wu et al. | 303/146 |
| 2008/0172163 A1 | 7/2008 | Englert et al. | |
| 2008/0177454 A1 | 7/2008 | Bond et al. | |
| 2008/0262686 A1 | 10/2008 | Kieren et al. | |
| 2009/0005932 A1 | 1/2009 | Lee et al. | |
| 2009/0005946 A1 | 1/2009 | Futamura et al. | |
| 2009/0093928 A1 | 4/2009 | Getman et al. | |
| 2009/0105906 A1 | 4/2009 | Hackney et al. | |
| 2009/0198425 A1* | 8/2009 | Englert | 701/70 |
| 2009/0210112 A1 | 8/2009 | Waldbauer et al. | |
| 2009/0228182 A1 | 9/2009 | Waldbauer et al. | |
| 2009/0306861 A1 | 12/2009 | Schumann et al. | |

FOREIGN PATENT DOCUMENTS

| | | |
|---|---|---|
| DE | 10212582 | 9/2003 |
| EP | 1477338 | 11/2004 |
| EP | 1516792 | 3/2005 |
| GB | 2402453 | 12/2004 |
| JP | 2001191964 | 7/2001 |
| JP | 2002243423 | 8/2002 |
| JP | 2005132360 | 5/2005 |
| WO | 2006/000578 | 1/2006 |
| WO | 2008/021942 | 2/2008 |

OTHER PUBLICATIONS

Kimbrough, Scott, et al., "A Control Strategy for Stabilizing Trailers Via Selective Actuation of Brakes", Dynamic Systems of Control Division (Publication) DSC, vol. 44, Transportation Systems, 1992, pp. 413-428, ASME 1992.

"Automobiles", 81 pages, Copyright 2004 by Marcel Dekker, Inc.

Tamura, Kazuya, et al., "Autonomous Vehicle Control System of ICVS City Pal: Electrical Tow-bar Function", Proceedings of the IEEE Intelligent Vehicles Symposium 2000, pp. 702-707, Dearborn (MI), USA, Oct. 3-5, 2000.

Kimbrough, Scott, "Coordinated Braking and Steering Control for Emergency Stops and Accelerations", American Society of Mechanical Engineers, Design Engineering Division (Publication) DE, vol. 40, Advanced Automotive Technologies, pp. 229-244, ASME 1991.

Liebemann, E., et al., "Light Commercial Vehicles—Challenges for Vehicle Stability Control", Robert Bosch GmbH, Chassis Systems Control, Germany, Paper No. 07-0269.

Deng, Weiwen, et al., "Parametric Study on Vehicle-Trailer Dynamics for Stability Control", SAE International, SAE Technical Paper Series, 2003-01-1321, 2003 SAE World Congress, Detroit, Michigan, Mar. 3-6, 2003.

Kimbrough, Scott, et al., "A Brake Control Algorithm for Emergency Stops (Which May Involve Steering) of Tow-Vehicle/Trailer Combinations", Proceedings of the American Control Conference, vol. 1, pp. 409-414, 1991.

Chen, Chieh, et al., "Steering and Independent Braking Control for Tractor-Semitrailer Vehicles in Automated Highway Systems", Proceedings of the 34th Conference on Decision and Control, New Orleans, LA, vol. 2, pp. 1561-1566, Dec. 13-15, 1995.

Tseng, et al., "The Development of Vehicle Stability Control at Ford", IEEE/ASME Transactions on Mechatronics, vol. 4, No. 3., pp. 223-234, Sep. 1999.

Wu, Kevin, "Enhancement of Trailer Sway Mitigation by Using Trailer Brakes", Trailer Sway Mitigation, Vehicle Dynamics Expo USA, 2008 Conference, Bosch TSM, Oct. 23, 2008.

Wang, Guo-Lin, et al., "Breaking Stability Analysis of Car-Trailer", Journal of Jiangsu University, Natural Science Edition, vol. 27, No. 2. pp. 130-132, Mar. 2006.

PCT/US2007/075561 International Search Report and Written Opinion, 15 pages, dated Dec. 7, 2007.

Office Action from the Japanese Patent Office for Application No. 2009-524739 dated Jul. 13, 2012 (Translation only, 2 pages).

* cited by examiner

TRAILER SWAY MITIGATION USING MEASURED DISTANCE BETWEEN A TRAILER AND A TOW VEHICLE

BACKGROUND

The present invention relates to trailer sway mitigation. More specifically, the invention relates to the use of ultrasonic or radar sensors in trailer sway mitigation.

Towing a trailer behind a vehicle often presents stability problems for both the vehicle and the trailer. Trailers tend to oscillate or sway back and forth in a lateral direction when being pulled behind a vehicle. The oscillations can be caused by a number of circumstances including excessive driving speed and severe changes in direction. For example, an operator of the vehicle may swerve to yield to a vehicle merging from a freeway ramp. The quick swerving movement is transferred to the trailer and the trailer may begin to oscillate. Without proper damping, the oscillations may continue to increase in magnitude. If the oscillations are not decreased, the vehicle and trailer may become unstable.

SUMMARY

Some methods have been developed to dampen and substantially decrease the frequency and magnitude of trailer oscillations in order to bring the vehicle and trailer back to a stable operating condition. For example, trailer sway mitigation ("TSM") in vehicles is described in U.S. patent application Ser. No. 11/503,875, filed on Aug. 11, 2006 (which is incorporated herein by reference). However, many current methods of trailer-sway mitigation use sensors that only detect vehicle characteristics. The position and oscillatory action of the trailer is not measured directly. As a result, current methods are subject to error, such as false activation when no trailer is present. In addition, the accuracy of the current methods is low because the actual trailer position and oscillatory behavior is estimated with no method for confirming the accuracy of the estimation.

The present invention provides a method of mitigating trailer sway by providing a direct and accurate measurement of the distance from a rear end of the vehicle to the trailer and providing the accurate measurements to an electronic control unit that implements the trailer sway mitigation. Thus, the method is only activated when the trailer is present. Furthermore, the method is more accurate because the actual trailer distances are measured and used as inputs to the method.

In one embodiment, the invention provides a method of controlling a vehicle and a trailer. The vehicle has a front and a rear end, and the trailer is coupled to the rear end. The method includes sensing a plurality of vehicle characteristics, sensing a distance between the vehicle and the trailer with a sensor positioned on the rear end of the vehicle, determining an oscillatory action of the trailer based on the sensed distance, and applying a braking force on at least one wheel of the vehicle in response to the oscillatory action.

In another embodiment, the invention provides a system for controlling a vehicle and a trailer. The vehicle has a front end and a rear end, and the trailer is coupled to the rear end. The system includes a plurality of vehicle characteristic sensors, at least one distance sensor, and an electronic control unit ("ECU"). Each of the plurality of vehicle characteristic sensors is configured to output a sensor signal. The distance sensor is coupled to the rear end of the vehicle and senses a distance between the rear end and the trailer and output a signal indicative of the sensed distance. The ECU receives the sensor signals and the distance signal, and determines a plurality of target characteristics based on the sensor signals. The ECU compares the sensor signals to the target characteristics and produces an error signal based on the comparison. A braking force is applied to the wheels of the vehicle in response to the error signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
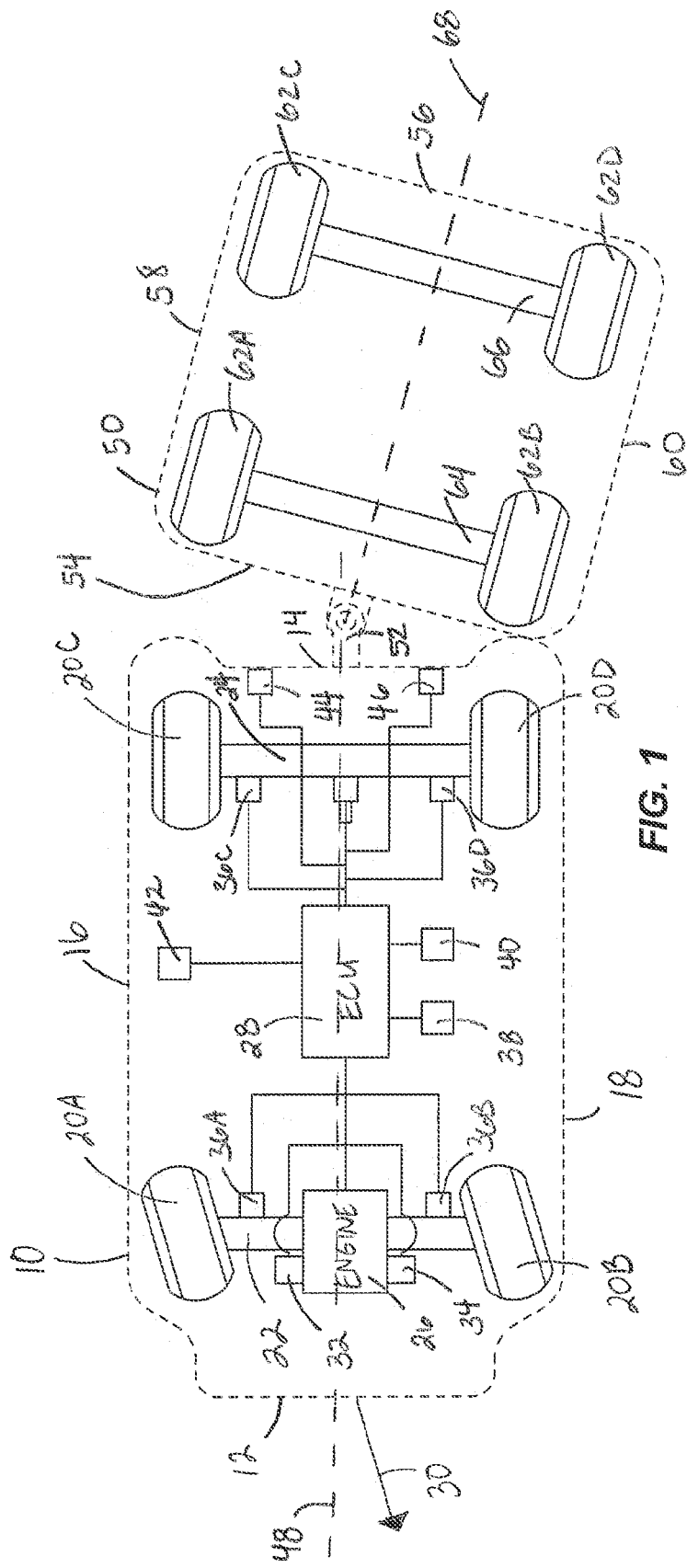
FIG. 1 is a schematic of a vehicle and a trailer.

FIG. 1 illustrates a vehicle 10 that has a front end 12, rear end 14, right side 16, left side 18, and four wheels 20A, 20B, 20C, and 20D. The front wheels 20A and 20B are coupled to a front axle 22, and the rear wheels 20C and 20D are coupled to a rear axle 24. The vehicle 10 includes an engine 26 and an electronic control unit ("ECU") 28. An operator of the vehicle 10 is assumed to be positioned in a driver's seat (on the left side in "left-hand drive" countries). The operator turns a steering wheel to direct the vehicle in a desired direction such as the direction of the arrow 30.

The vehicle 10 includes a plurality of sensors that provide information to the ECU 28. The sensors include a steering angle sensor 32, an engine torque sensor 34, a wheel speed sensor corresponding to each wheel 36A, 36, 36C, and 36D, a brake-system master cylinder pressure sensor 38, a lateral acceleration sensor 40, a yaw rate sensor 42, a right distance sensor 44, and a left distance sensor 46. Of course, in other embodiments, the vehicle 10 could include more or less sensors. The vehicle 10 defines a longitudinal vehicle axis 48.

A trailer 50 is coupled to the rear end of the vehicle by a hitch 52. The trailer 50 includes a front end 54, rear end 56, right side 58, left side 60, and four wheels 62A, 62B, 62C, and 62D. The front wheels 62A and 62B are coupled to a front axle 64, and the rear wheels 62C and 62D are coupled to a rear axle 66. Trailers with more or less axles can be used with embodiments of the invention. The trailer 50 also has a longitudinal trailer axis 68 and rear taillights that operate in response to operator input from the vehicle 10 such as braking and turn signals. Unlike the vehicle 10, the trailer 50 does not include an electronic control unit.

As noted, the trailer 50 may begin to oscillate when towed and the oscillation may affect the vehicle 10. The vehicle operator may respond to the oscillation by steering or pressing a brake pedal in an attempt to compensate for movement of the vehicle 10. The operator may over-steer and may lose control of the vehicle.

Figure 3:
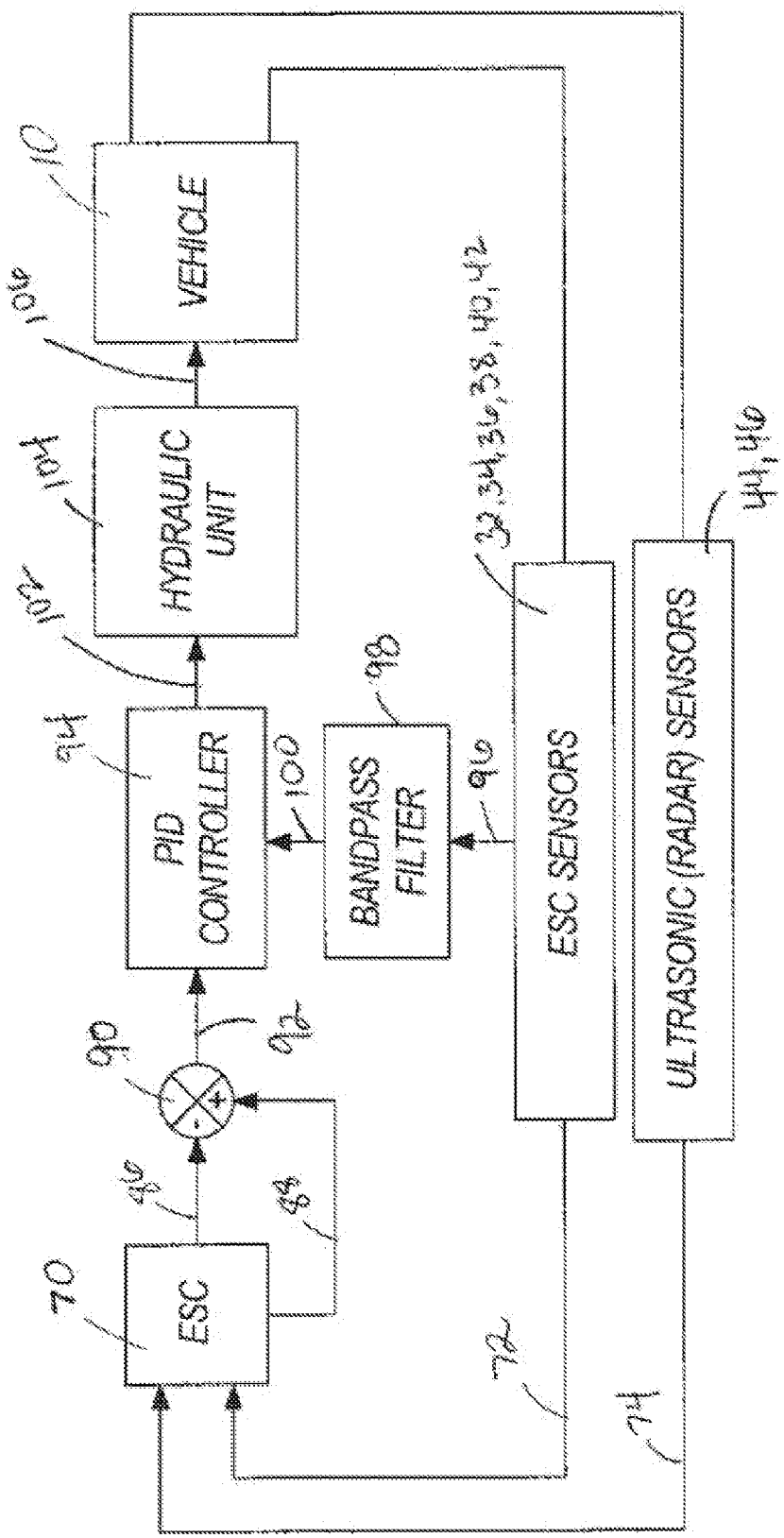
FIG. 3 is a schematic of the control system used in FIGS. 1 and 2.

The vehicle 10 includes a trailer sway mitigation ("TSM") function to increase the stability of the vehicle 10 when towing the trailer 50, the logic of the TSM function is illustrated in FIG. 3. The TSM function uses an electronic stability control ("ESC") application or module 70. The module 70 is a software program that is executed by the ECU 28. The ECU 28 receives signals 72 corresponding to vehicle characteristics from the vehicle sensors (e.g., the steering angle sensor 32, the engine torque sensor 34, wheel speed sensors 36, master cylinder pressure sensor 38, lateral acceleration sensor 40, and yaw rate sensor 42). In addition, the ESC module 70 also receives input 74 from the right and left distance sensors 44 and 46, which can be ultrasonic or radar based sensors.

In general terms, the TSM increases the stability of the vehicle 10 by causing the brakes (or, more broadly, wheel torque) to be controlled in a specified manner. Symmetric and asymmetric braking (or, more broadly, torque control) is applied to the vehicle wheels 20 to dampen trailer oscillations. Symmetric braking forces are applied equally to the vehicle wheels typically all four wheels (or the two front wheels or the two rear wheels). Asymmetric braking forces are applied unequally to one or more of the wheels. For example, a braking force may be applied to only the front right wheel (or only the rear right, or both right wheels). Then, a similar barking force may be applied to only the front left wheel (or only the rear left, or both left wheels). Various asymmetric braking may be carried out until trailer oscillations decrease.

The ESC module 70 determines a gain value K based on the vehicle speed and vehicle yaw rate. As shown on FIG. 2, the road wheel angle $\psi(t)$ of the vehicle is a function of the steering wheel steering input from the vehicle operator or driver (input lws). The vehicle road wheel angle $\psi(t)$ is visually illustrated in FIG. 2 and is calculated using Equation 1.

$$\psi(t) = f(lws) \qquad \text{Equation 1}$$

The right distance sensor 44 and the left distance sensor 46 are mounted on the rear end 14 of the vehicle 10 and are spaced from each other. As illustrated, the right sensor 44 is a distance $l_1$ from the longitudinal axis 48 and the left sensor 46 is a distance $l_2$ from the longitudinal axis 48. The distances $l_1$ and $l_2$ do not change and the values of $l_1$ and $l_2$ (in meters) are stored in a memory of the ECU 28.

During operation, the target trailer position is calculated. For example, when the operator turns the steering wheel, the target trailer position, defined by a target trailer sway angle $\theta_{so}(t)$, is determined based on the steering angle input lws using Equation 2.

$$\theta_{so}(t) = K^* \psi(t) \qquad \text{Equation 2}$$

The target trailer sway angle $\theta_{so}(t)$ describes the relationship between the longitudinal vehicle axis 48 and the longitudinal trailer axis 68. When the trailer 50 is in line with the vehicle 10, then the longitudinal vehicle axis 48 and the longitudinal trailer axis 68 are parallel to each other and $\theta(t)$ is equal to zero degrees.

Figure 2:
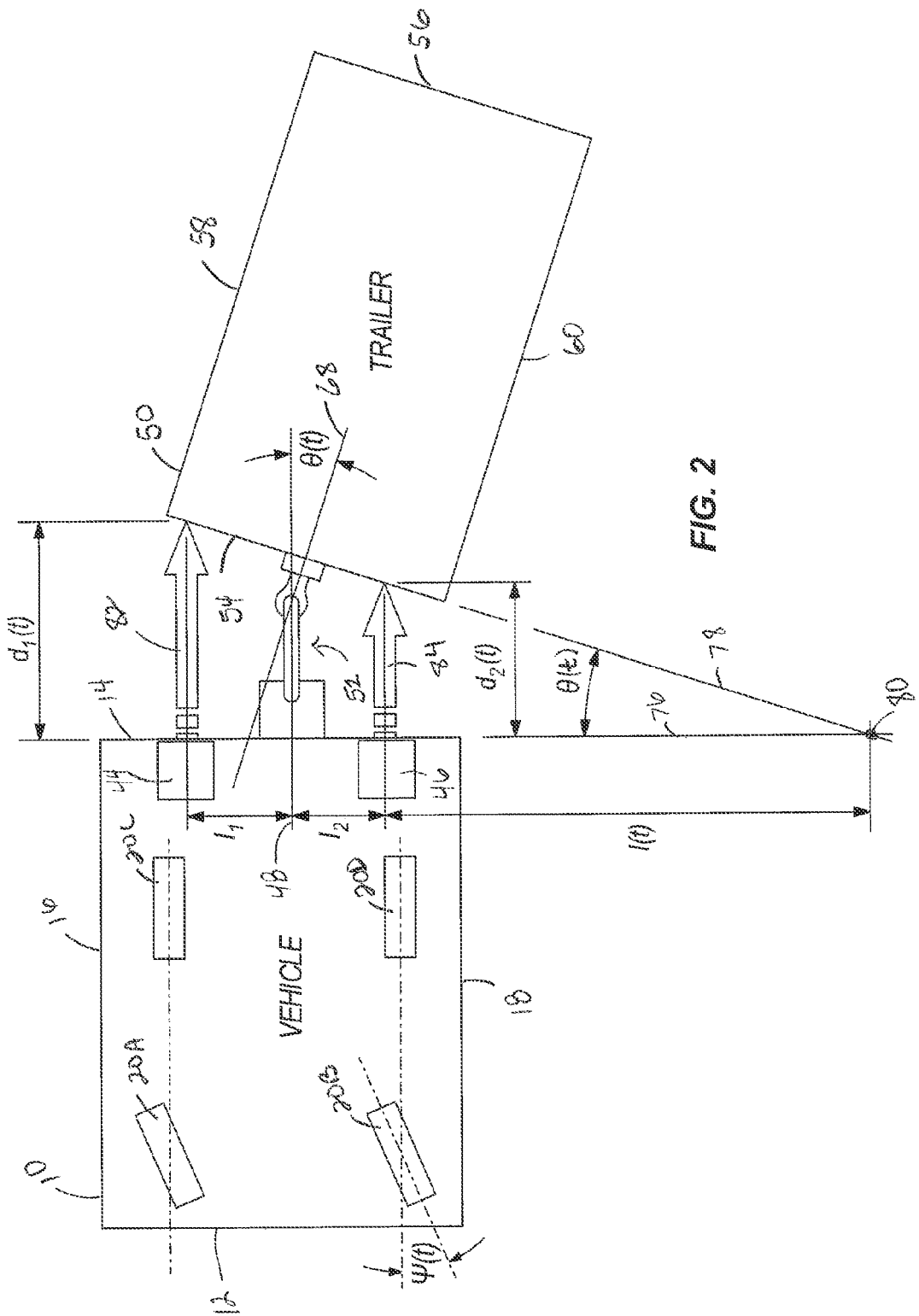
FIG. 2 is a schematic similar to FIG. 1 illustrating the sensors and measured parameters.

The right target distance $d_{1so}(t)$ and the left target distance $d_{2so}(t)$ are calculated using Equation 3. The right target distance $d_{1so}(t)$ is the distance from the rear end 14 of the vehicle 10 adjacent the right sensor 44 to the front end 54 of the trailer 50. Similarly, the left target distance $d_{2so}(t)$ is the distance from the rear end 14 of the vehicle 10 adjacent the left sensor 46 to the front end 54 of the trailer 50, along a line that is substantially parallel to the longitudinal vehicle axis 48. If a line 76 parallel to the rear end 14 of the vehicle 10 is extended and a line parallel 78 to the front end 54 of the vehicle 50 is extended, the lines intersect at a point 80. The angle between the lines 76 and 78 is equal to the trailer sway angle $\theta(t)$. The length $l(t)$ is defined as the distance from the left sensor 46 to the point 80, as illustrated in FIG. 2. Thus, the relationship between the variables can be described using similar right triangles, and the target distances $d_{1so}(t)$ and $d_{2so}(t)$ are calculated using Equation 3.

$$\tan\theta_{so}(t) = \frac{d_{2so}(t)}{l(t)} = \frac{d_{1so}(t)}{l(t) + l_1 + l_2} \qquad \text{Equation 3}$$

The actual right distance $d_1(t)$ and the actual left distance $d_2(t)$ are determined by analyzing the signals produced and received by the right and left distance sensors 44 and 46. The right and left distance sensors 44 and 46 can be ultrasonic sensors, radar sensors, or the like. The right distance sensor 44 emits a signal 82 in the direction of the trailer 50. At least a portion of the signal 82 is reflected back toward the right sensor 44 and the sensor determines the right distance $d_1(t)$ based on the amount of elapsed time. The left distance sensor 46 emits a signal 84 in the direction of the trailer 50 and determines the amount of time for the signal 84 to reach the front end of the trailer 54 and reflect back to the left distance sensor 46.

After the target right and left distances $d_{1so}(t)$ and $d_{2so}(t)$ are calculated and the actual right and left distances $d_1(t)$ and $d_2(t)$ are received from the distance sensors, a right error signal $\epsilon_1(t)$ 86 and a left error signal $\epsilon_2(t)$ 88 are calculated using Equations 4 and 5, respectively.

$$\epsilon_1(t) = d_1(t) - d_{1so}(t) \qquad \text{Equation 4}$$

$$\epsilon_2(t) = d_2(t) - d_{2so}(t) \qquad \text{Equation 5}$$

A summing node 90 sums the error signals 86 and 88 calculated by the ESC using Equations 4 and 5 and outputs the sum (controller input) 92 to a proportional-integral-derivative (PID) controller 94. The ESC sensors 32, 34, 36, 38, 40 and 42 also provide outputs 96 that are filtered using a bandpass filter 98 and are provided to the PID controller 94. The PID controller 94 uses the error signal 92 and the filtered ESC sensor outputs 100 to produce a control signal 102 that is provided to a hydraulic unit 104. The hydraulic unit 104 produces an output 106 to apply symmetric braking, asymmetric braking, or both to the vehicle 10. The process is repeated until the trailer oscillations are below a predetermined threshold value.

The output 106 of the hydraulic unit 104 also depends upon an analysis of certain thresholds, including (1) $\theta(t)$ converges to $\theta_{so}(t)$, i.e. $|\theta(t) - \theta_{so}(t)| < 3°$ and $$(2) \quad \frac{d(\theta(t))}{dt} < 0.$$

If the absolute value of the difference between the actual or measured sway angle $\theta(t)$ and the target sway angle $\theta_{so}(t)$ is greater than three (3) degrees, braking is applied. Symmetric braking is applied when $$\frac{d(\theta(t))}{dt} <= 0.$$

Asymmetric braking is applied when $$\frac{d(\theta(t))}{dt} \text{ is } > 0.$$

If the actual sway angle θ(t) is negative, braking is applied to the left wheels. If θ(t) is positive, braking is applied to the right wheels.

Figure 4:
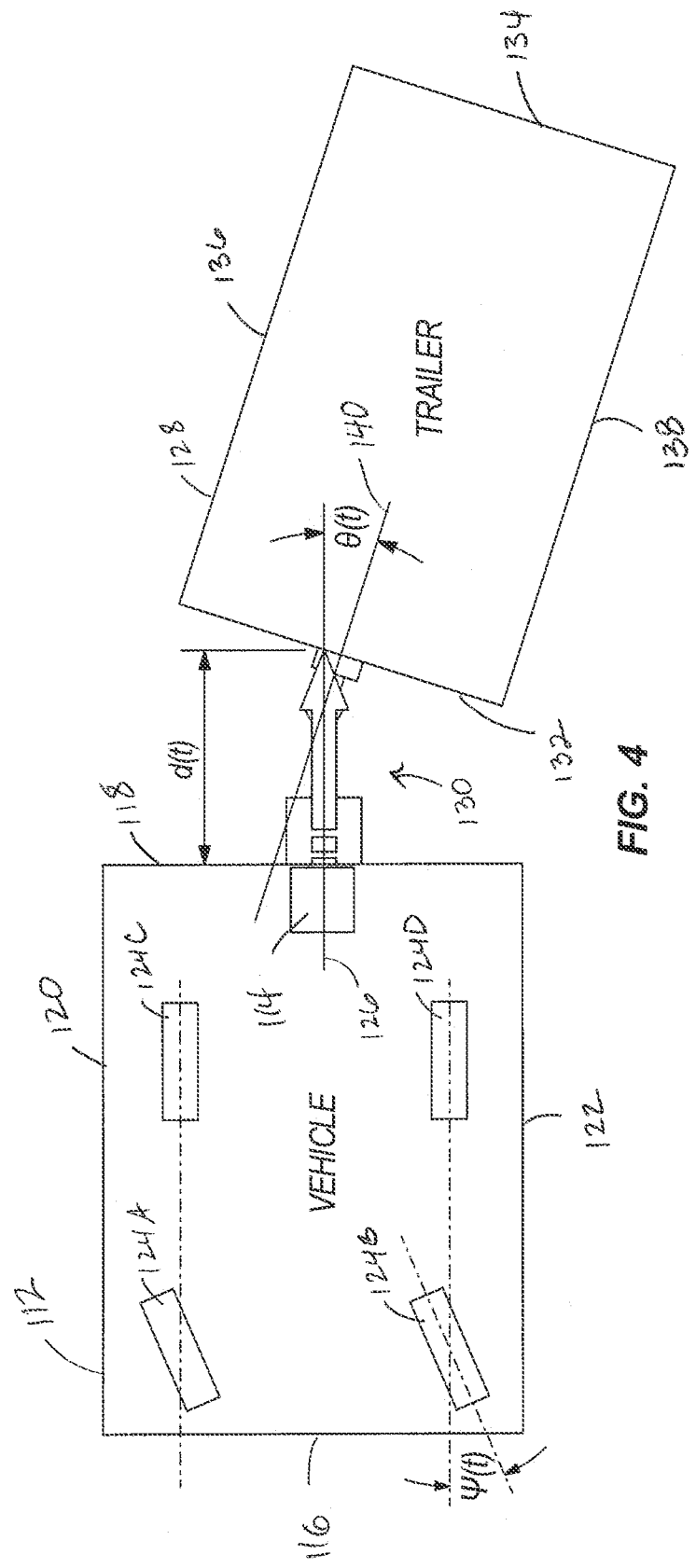
FIG. 4 is a schematic similar to FIGS. 1 and 2 including a system with one sensor.

FIG. 4 schematically illustrates a plan view of a vehicle 112 similar to the vehicle 10 of FIGS. 1 and 2 having only one distance sensor 114. The vehicle includes a front end 116, a rear end 118, a right side 120, a left side 122, and four wheels 124A, 124B, 124C, and 124D. The vehicle also defines a longitudinal axis 126. A trailer 128 is coupled to the vehicle 112 by a hitch 130. The trailer 128 includes a front end 132, a rear end 134, a right side 136, and a left side 138. The trailer 128 includes a longitudinal trailer axis 140.

The distance sensor 114 is positioned adjacent the hitch 130 and is aimed toward the trailer 128 along a line substantially parallel to the longitudinal vehicle axis 126. The logic of FIG. 3 also applies to the system of FIG. 4 except only one error signal is calculated by the ESC module 70. Thus, no summing node is required for the system of FIG. 4. The ESC sensors determine vehicle characteristics and provide sensor outputs 72 to the ESC module 70 and to the PID controller 94. The distance sensor outputs a signal 74 representative of the distance d(t) from the rear end 118 of the vehicle 112 to the front end 132 of the trailer 128. From the sensor output 74, the ESC module 70 calculates the vehicle road wheel angle ψ(t) as described above with respect to Equation 1. The ESC module 70 determines the gain value K based on the vehicle speed and vehicle yaw rate, and uses the gain value K to the vehicle road wheel angle ψ(t) to calculate the target trailer sway $\theta_{so}(t)$ using Equation 2 above.

The target distance $d_{so}(t)$ is calculated using Equation 6.

$$d_{so}(t) = \frac{d_o}{\cos\theta_{so}(t)} \quad \text{Equation 6}$$

$d_o$ is the distance between the vehicle and the trailer when θ=0 (i.e., the trailer is aligned with the vehicle). The ESC module 70 receives the sensed distance d(t) and compares the sensed distance d(t) to the target distance $d_{so}(t)$ to determine an error signal ε(t) using Equation 7.

$$\epsilon(t) = d(t) - d_{so}(t) \quad \text{Equation 7}$$

The error signal 92 is used by the PID controller 94 to determine whether to apply symmetric braking, asymmetric braking, or both to the wheels. The control signal 102 produced by the PID controller 94 is provided to the hydraulic unit 104 to apply braking force to the wheels of the vehicle 112. Thus, trailer oscillations are decreased and the stability of both the vehicle 112 and the trailer 128 is increased.

Thus, the invention provides, among other things, a method of controlling a vehicle and a trailer using a trailer sway mitigation control system. Various features and advantages of the invention are set forth in the following claims.

What is claimed is:

1. A method of controlling a vehicle and a trailer, the vehicle having a front end and a rear end and the trailer coupled to the rear end, the method comprising:
   sensing a steering angle of the vehicle;
   sensing, during vehicle operation, a distance between the vehicle and the trailer with a sensor positioned on the rear end of the vehicle;
   calculating, during vehicle operation, a target distance between the rear end of the vehicle and the trailer based on the sensed steering angle of the vehicle;
   determining an error signal based on the sensed distance and the target distance; and
   during a vehicle turn, applying a braking force on at least one wheel of the vehicle in response to the error signal.

2. The method of claim 1, wherein the sensor includes an ultrasonic sensor.

3. The method of claim 2, wherein sensing the distance between the vehicle and the trailer further comprises emitting an ultrasonic pulse from the ultrasonic sensor coupled to the rear end of the vehicle, receiving a reflection of the ultrasonic pulse with the ultrasonic sensor, calculating an amount of time to receive the reflection, and determining the distance based on the amount of time.

4. The method of claim 1, wherein the sensor includes a radar sensor.

5. The method of claim 1, wherein calculating the target distance includes calculating the target distance based on the steering angle, a vehicle speed, and a vehicle yaw rate.

6. The method of claim 1, further comprising determining a sway angle of the trailer.

7. The method of claim 1, further comprising:
   sensing a second distance between the vehicle and the trailer,
   calculating a second target distance between the rear end of the vehicle and the trailer;
   determining a second error signal based on the sensed second distance and the second target distance; and
   applying the braking force in response to the second error signal.

8. The method of claim 1, wherein applying the braking force further comprises applying one of a symmetric braking force and an asymmetric braking force.

9. The method of claim 8, further comprising applying the asymmetric braking force if a change in a measured sway angle of the trailer is greater than zero.

10. A system for controlling a vehicle and a trailer, the vehicle having a front end and a rear end and the trailer coupled to the rear end, the system comprising:
    a sensor configured to output a steering angle of the vehicle;
    at least one distance sensor coupled to the rear end of the vehicle, the at least one distance sensor configured to sense a distance between the rear end and the trailer and to output a distance signal indicative of the sensed distance;
    an electronic control unit coupled to the vehicle and configured to receive the steering angle of the vehicle and the distance signal, the electronic control unit configured to calculate, during vehicle operation, a target trailer distance based on the steering angle of the vehicle, to determine an error signal based on the sensed distance and the target trailer distance, and to apply, during a vehicle turn, a braking force to at least one wheel of the vehicle in response to the error signal.

11. The system of claim 10, wherein the distance sensor is an ultrasonic sensor.

12. The system of claim 10, wherein the distance sensor is a radar sensor.

13. The system of claim 10, further comprising a second distance sensor coupled to the rear end, the second distance sensor spaced from the first distance sensor, wherein the electronic control unit is configured to receive the first distance signal from the first distance sensor and a second distance signal from the second distance sensor, to calculate a second target trailer distance based on the steering angle of the vehicle, to determine a second error signal based on the second sensed distance and the second target trailer, and to apply the braking force in response to the second error signal.

14. The system of claim 10, wherein the electronic control unit is configured to calculate the target trailer based on the steering angle, a vehicle speed, and a vehicle yaw rate.

15. The system of claim 10, wherein applying the braking force includes one of applying a symmetric braking force and applying an asymmetric braking force to the wheels of the vehicle.

16. The system of claim 15, wherein the electronic control unit applies the symmetric braking force when the error signal is above a first threshold value and applies the asymmetric braking force when the error signal is equal to or below the first threshold value and above a second threshold value.

\* \* \* \* \*